Feb. 11, 1947.     H. H. MEIER     2,415,700
PRODUCTION OF HIGH QUALITY DIESEL FUEL
Filed Dec. 26, 1944
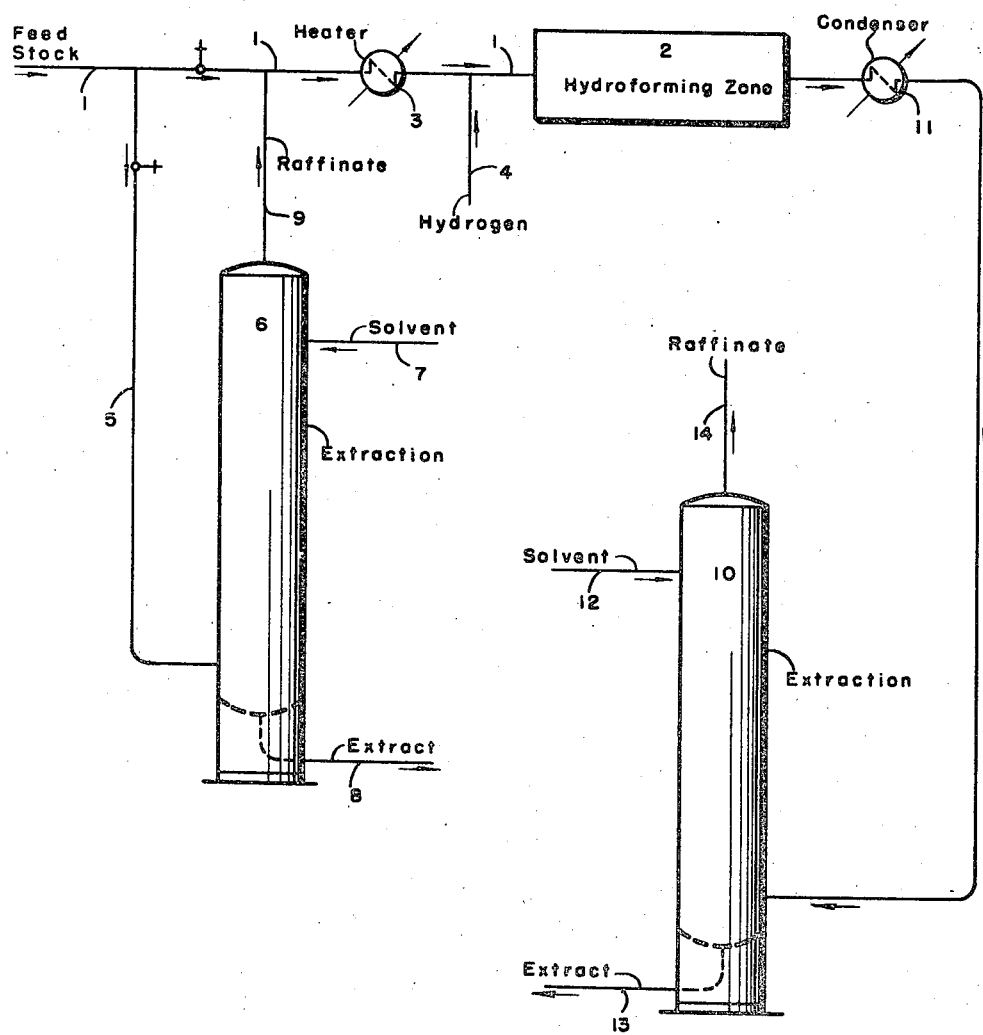
Herbert H. Meier INVENTOR.
BY
P. J. Whelan
ATTORNEY.

Patented Feb. 11, 1947

2,415,700

UNITED STATES PATENT OFFICE 2,415,700

PRODUCTION OF HIGH QUALITY DIESEL FUEL

Herbert H. Meier, Baytown, Tex., assignor to Standard Oil Development Company, a corporation of Delaware Application December 26, 1944, Serial No. 569,789

3 Claims. (Cl. 196—13)

The present invention is directed to a method for producing improved Diesel fuels.

It is known that the quality of gas oil, as a Diesel fuel, increases as its content of straight-chain paraffins and naphthenes with only a limited number of side chains increases. There are virgin gas oils which are predominately straight-chain paraffins and naphthenes containing only minor amounts (from 5 to 10%) of aromatics. It is postulated that the condensed ring naphthenes are less desirable than the simpler naphthenes as components of a Diesel fuel. For example, it is believed that naphthenes with only one ring and a long paraffinic side chain are more effective fuels than those with two or more rings. That is to say, these desirable gas oils contain effective naphthenes and those of simpler character are of greater value in Diesel fuels.

It is understood that the quality of these virgin gas oils, or any other gas oils having a similar makeup, can be improved by solvent extraction with solvents such as phenol, furfural, sulfur dioxide, nitrobenzene, chlorinated hydrocarbons and the like which have a selective solvent action for aromatics. These selective solvents do not, however, serve to remove the undesirable naphthenes.

According to the present invention a gas oil having a composition of the type referred to is converted into a more valuable Diesel fuel by being subjected to a hydroforming operation calculated to convert the simpler naphthenes into aromatics whereby the resulting aromatics can be solvent extracted from the gas oil. The hydroforming is carried out for this purpose under comparatively mild conditions compared to those employed in naphtha reforming. For example, the operating temperature should be between about 850° and 950°, the pressure should be between about 300 and 350 pounds per square inch, the feed rate should be between about 0.5 and 3.5 volumes of gas oil per volume of catalyst per hour, and hydrogen should be employed in an amount ranging between about 1000 and 3000 cubic feet per barrel. The catalyst may be selected from a fairly large list of catalyst found suitable for hydroforming operations with the qualification that hydroforming catalysts which tend to facilitate the cyclicization of paraffins should be avoided. A suitable catalyst is one composed of molybdenum oxide and gamma alumina having a low soda content. Metal sulfides may also be employed either alone or in admixture with each other, such as for example, a mixture of nickel sulfide and tungsten sulfide. In general, catalysts containing 6th group metal oxides, preferably in conjunction with alumina, are satisfactory.

In the accompanying drawing the single figure is a front elevation in diagrammatic form of one type of apparatus which may be employed for the practice of the present invention.

Referring to the drawing in detail, numeral 1 designates a feed line for the gas oil to be processed. This feed line discharges into a hydroforming chamber 2 after passing through a preheater 3 where the gas oil is brought to the desired reaction temperature. Ahead of the reaction chamber is a branch line 4 for injecting hydrogen into the feed line.

If desired, the feed stock may be initially solvent extracted for the removal of aromatics. For this purpose a branch line 5 is connected to line 1 and discharges into the lower end of an extraction vessel 6. Selective solvent, such as phenol, is fed into the upper part of vessel 6 through line 7 and extract is withdrawn from the lower end thereof through line 8. This vessel will ordinarily be provided with internal contact equipment to facilitate mixing of the feed stock and the solvent. Raffinate leaves the top of vessel 6 through line 9 and returns to line 1. The effluent from the hydroforming chamber is introduced into the lower part of an extraction vessel 10 after first passing through a condenser 11. If desired, this condenser may be omitted because in the extraction tower the gas oil vapors will be condensed during the extraction process which in this case will be partially vapor phase and partially liquid phase. The selective solvent is introduced into the upper portion of vessel 10 through line 12 and extract is withdrawn from the bottom thereof through line 13. Raffinate leaves the top of the vessel through line 14.

In some cases the hydroforming operation will result in the conversion of some of the paraffins to olefins. When this occurs the raffinate from the extraction vessel 10 should be subjected to conventional hydrogenation for the purpose of reconverting the olefins back to paraffins. This hydrogenation, when required, will be of the low temperature type in which a simple hydrogenation catalyst, such as metallic nickel, is employed. The details of this type of hydrogenation are well known and need not be further elaborated on.

As a result of the processes described above, the pour point of the gas oil may be substantially raised. If reduction of this pour point is desired, it is preferred to accomplish it by the addition of a pour point depressant of the type readily available on the market rather than by dewaxing.

Throughout the specification and claims use has been made of the term "hydroforming." In the sense that hydroforming is used is describing the present invention, it is synonymous with catalytic reforming in the presence of hydrogen and shall be understood to mean a process of catalytic reforming carried out in the presence of added or recirculated hydrogen or gases containing hydrogen under such conditions that there is no overall net consumption of free hydrogen or there is an overall net production of free hydrogen.

The nature and objects of the present invention having been thus described and illustrated, what is claimed as new and useful and is desired to be secured by Letters Patent is:

1. A method for improving the Diesel quality of a gas oil containing paraffins and low quality naphthenes which comprises subjecting the gas oil in admixture with hydrogen to the action of a hydroforming catalyst free from components which promote the cyclicization of paraffins at a temperature between about 850° and 950° F. under elevated pressure and with a feed rate between 0.5 and 3.5 volumes of gas oil per volume of catalyst per hour and subjecting the product of this catalytic operation to solvent extraction for the removal therefrom of aromatics.

2. A method according to claim 1 in which the catalyst employed contains a compound of a metal of group 6 of the periodic system.

3. A method for improving the Diesel quality of a gas oil containing paraffins, low quality naphthenes and aromatics which comprises subjecting the gas oil to solvent extraction for the removal therefrom of aromatics, subjecting the raffinate of said extraction operation to a mild hydroforming operation suitable for the conversion of the naphthenes to aromatics and then subjecting the product of the hydroforming operation to a second solvent extraction for the removal therefrom of aromatics.

HERBERT H. MEIER.

REFERENCES CITED

The following references are of record in the file of this patent:

UNITED STATES PATENTS

| Number | Name | Date |
|---|---|---|
| 2,366,490 | Cloud | Jan. 2, 1945 |
| 2,268,094 | Russell | Dec. 30, 1941 |
| 2,271,214 | Welty | Jan. 27, 1942 |
| 2,339,108 | Pier et al. | Jan. 11, 1944 |
| 2,361,080 | Bolt et al. | Oct. 24, 1944 |

FOREIGN PATENTS

| Number | Country | Date |
|---|---|---|
| 850,899 | French | Sept. 18, 1939 |
| 373,670 | Italian | Aug. 1, 1939 |
| 441,104 | British | Jan. 13, 1936 |
| 423,001 | British | Jan. 23, 1935 |